United States Patent
Subramanian (10) Patent No.: US 12,177,146 B2
(45) Date of Patent: Dec. 24, 2024

(54) SYSTEM AND METHOD FOR ASSISTING DATA TRANSMISSION OVER VIRTUAL CHANNELS

(71) Applicant: E-CON SYSTEMS INDIA PRIVATE LIMITED, Chennai (IN)

(72) Inventor: Anandaraj Subramanian, Chennai (IN)

(73) Assignee: e-Con Systems India Private Limited (IN)

( * ) Notice: Subject to any disclaimer, the term of this patent is extended or adjusted under 35 U.S.C. 154(b) by 389 days.

(21) Appl. No.: 17/681,930

(22) Filed: Feb. 28, 2022

(65) Prior Publication Data

US 2023/0275716 A1     Aug. 31, 2023

(51) Int. Cl.
| | |
|---|---|
| *H04L 5/00* | (2006.01) |
| *H04W 4/38* | (2018.01) |
| *H04W 48/16* | (2009.01) |

(52) U.S. Cl.
CPC ............. *H04L 5/0048* (2013.01); *H04W 4/38* (2018.02); *H04W 48/16* (2013.01)

(58) Field of Classification Search
CPC .......... H04L 5/0048; H04L 5/14; H04W 4/38; H04W 48/16
See application file for complete search history.

(56) References Cited

U.S. PATENT DOCUMENTS

| | | | | |
|---|---|---|---|---|
| 8,873,438 | B2* | 10/2014 | Padmanabh | H04W 28/02 |
| | | | | 370/310 |
| 2010/0135494 | A1* | 6/2010 | Armknecht | H04L 67/12 |
| | | | | 380/279 |
| 2011/0242342 | A1* | 10/2011 | Goma | H04N 23/665 |
| | | | | 348/E5.024 |

(Continued)

FOREIGN PATENT DOCUMENTS

| | | |
|---|---|---|
| CN | 102447847 A | 5/2012 |
| CN | 212572677 U | 2/2021 |
| TW | 202110144 A | 3/2021 |

OTHER PUBLICATIONS

MIPI CSI-2 Virtual Channel Aggregation with CrossLink-NX.

*Primary Examiner* — Un C Cho
*Assistant Examiner* — Lalita W Pace
(74) *Attorney, Agent, or Firm* — Jason C. Cameron (57) ABSTRACT

A system for assisting data transmission over virtual channel(s) is disclosed. The system includes an interface aggregator unit which includes a processing subsystem which includes a trigger generator module which generates and transmits a trigger signal to at least two sensors for maintaining a data synchronization. The processing subsystem also includes a receiver module which receives the multiple first data packets and the multiple second data packets. The processing subsystem also includes a byte-prepend module which generates first data and second data by prepending at least one first byte to each of the multiple first data packets and at least one second byte to each of the multiple second data packets (Continued)

respectively. The processing subsystem also includes a combiner module which generates merged data. The processing subsystem also includes a transmission control module which controls a transmission of the merged data to the host processor, thereby assisting the data transmission over the virtual channel(s).

10 Claims, 4 Drawing Sheets

(56) References Cited

U.S. PATENT DOCUMENTS

| | | | | |
|---|---|---|---|---|
| 2017/0289646 | A1* | 10/2017 | Kanthapanit | H04N 5/0675 |
| 2019/0250611 | A1* | 8/2019 | Costin | G05D 1/2244 |
| 2020/0128061 | A1* | 4/2020 | Esmail | H04W 4/48 |

* cited by examiner

SYSTEM AND METHOD FOR ASSISTING DATA TRANSMISSION OVER VIRTUAL CHANNELS

FIELD OF INVENTION

Embodiments of a present disclosure relate to a data transmission field, and more particularly to a system and method for assisting data transmission over one or more virtual channels.

BACKGROUND

Modern Image Processing Applications are growing more robust in delivering answers to complicated challenges in these developing times of technology development. The performance of these algorithms is directly dependent on the underlying host processor's ability to acquire the relevant data, such as image frames and other auxiliary data like strobe status, IMU accelerometer, Gyro meter, and so on. For retrieving the image camera frames and the auxiliary data, current implementations use distinct independent pipelines. Because of the delay in receiving the auxiliary data and then processing it together with the corresponding image frame, parallel pipelines aren't appropriate for applications that require real-time auxiliary data synchronized with each image frame.

Also, with an increase in the count of sensors connected to the host processor, with an increase in complexity of the sensors, the host processor has to support transmission interfaces of different sensors, which will increase system cost and power consumption. Moreover, every time the host processor is receiving data with different properties, the host processor has to prepare itself for the same, thereby adding a burden to the host processor.

Hence, there is a need for an improved system and method for assisting data transmission over one or more virtual channels which addresses the aforementioned issues.

BRIEF DESCRIPTION

In accordance with one embodiment of the disclosure, a system for assisting data transmission over one or more virtual channels is provided. The system includes an interface aggregator unit. The interface aggregator unit is operatively coupled to at least two sensors via corresponding at least two receiver interfaces. The interface aggregator unit is also operatively coupled to a host processor via a transmitter interface. Further, the interface aggregator unit includes a processing subsystem. The processing subsystem is configured to execute on a network to control bidirectional communications among a plurality of modules. The processing subsystem includes a trigger generator module. The trigger generator module is configured to generate a trigger signal based on a predefined trigger generation logic upon initiation of an operation of the interface aggregator unit or a transmission request from a user. The trigger generator module is also configured to transmit the trigger signal to the corresponding at least two sensors for maintaining a data synchronization between a plurality of first data packets from a first set of sensors of the at least two sensors and a plurality of second data packets from a second set of sensors of the at least two sensors. The processing subsystem also includes a receiver module operatively coupled to the trigger module. The receiver module is configured to receive the plurality of first data packets from the first set of sensors of the at least two sensors using a predefined receiver interface protocol based on the transmission of the trigger signal. The receiver module is also configured to receive the plurality of second data packets from the second set of sensors of the at least two sensors using the predefined receiver interface protocol and simultaneously with the plurality of first data packets. Further, the processing subsystem also includes a byte-prepend module operatively coupled to the receiver module. The byte-prepend module is configured to generate first data by prepending at least one first byte to each of the plurality of first data packets upon receipt, based on a predefined byte prepend logic. The byte-prepend module is also configured to generate second data by prepending at least one second byte to each of the plurality of second data packets upon receipt, based on the predefined byte prepend logic. Furthermore, the processing subsystem also includes a combiner module operatively coupled to the byte-prepend module. The combiner module is configured to generate merged data by combining the first data with the second data using a predefined combiner logic. Furthermore, the processing subsystem also includes a transmission control module operatively coupled to the combiner module. The transmission control module is configured to control a transmission of the merged data to the host processor along with a decoder logic using a predefined transmitter interface protocol, thereby assisting the data transmission over the one or more virtual channels.

In accordance with another embodiment, a method for assisting data transmission over one or more virtual channels is provided. The method includes generating a trigger signal based on a predefined trigger generation logic upon initiation of an operation of the interface aggregator unit or a transmission request from a user. The method also includes transmitting the trigger signal to the corresponding at least two sensors for maintaining a data synchronization between a plurality of first data packets from a first set of sensors of the at least two sensors and a plurality of second data packets from a second set of sensors of the at least two sensors. Further, the method also includes receiving the plurality of first data packets from the first set of sensors of the at least two sensors using a predefined receiver interface protocol based on the transmission of the trigger signal. Furthermore, the method also includes receiving the plurality of second data packets from the second set of sensors of the at least two sensors using the predefined receiver interface protocol and simultaneously with the plurality of first data packets. Furthermore, the method also includes generating first data by prepending at least one first byte to each of the plurality of first data packets upon receipt, based on a predefined byte prepend logic. Furthermore, the method also includes generating second data by prepending at least one second byte to each of the plurality of second data packets upon receipt, based on the predefined byte prepend logic. Furthermore, the method also includes generating merged data by combining the first data with the second data using a predefined combiner logic. Furthermore, the method also includes controlling a transmission of the merged data to the host processor along with a decoder logic using a predefined transmitter interface protocol, thereby assisting the data transmission over the one or more virtual channels.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for assisting data transmission over one or more virtual channels. As used herein, the term "data transmission" is defined as a transfer of data from one digital device to another. This transfer occurs via point-to-point data streams or channels. In one embodiment, the digital device may include one or more sensors, a processor, or the like. Basically, in an embodiment, the one or more sensors may sense data to be transmitted to the processor for processing. In an embodiment, the data may vary in resolution, format, rate, and the like when received from the one or more sensors that are different from each other. In one exemplary embodiment, the data may be image data, video data, textual data, a signal, and the like. Also, different sensors may need different interfaces to be available on the processor for the processor to receive the corresponding data, thereby increasing system cost and power consumption by the processor. Therefore, there is a need for a system for assisting in the data transmission over the one or more virtual channels. Further, the system described hereafter in FIG. 1 is the system for assisting the data transmission over the one or more virtual channels.

Figure 1:
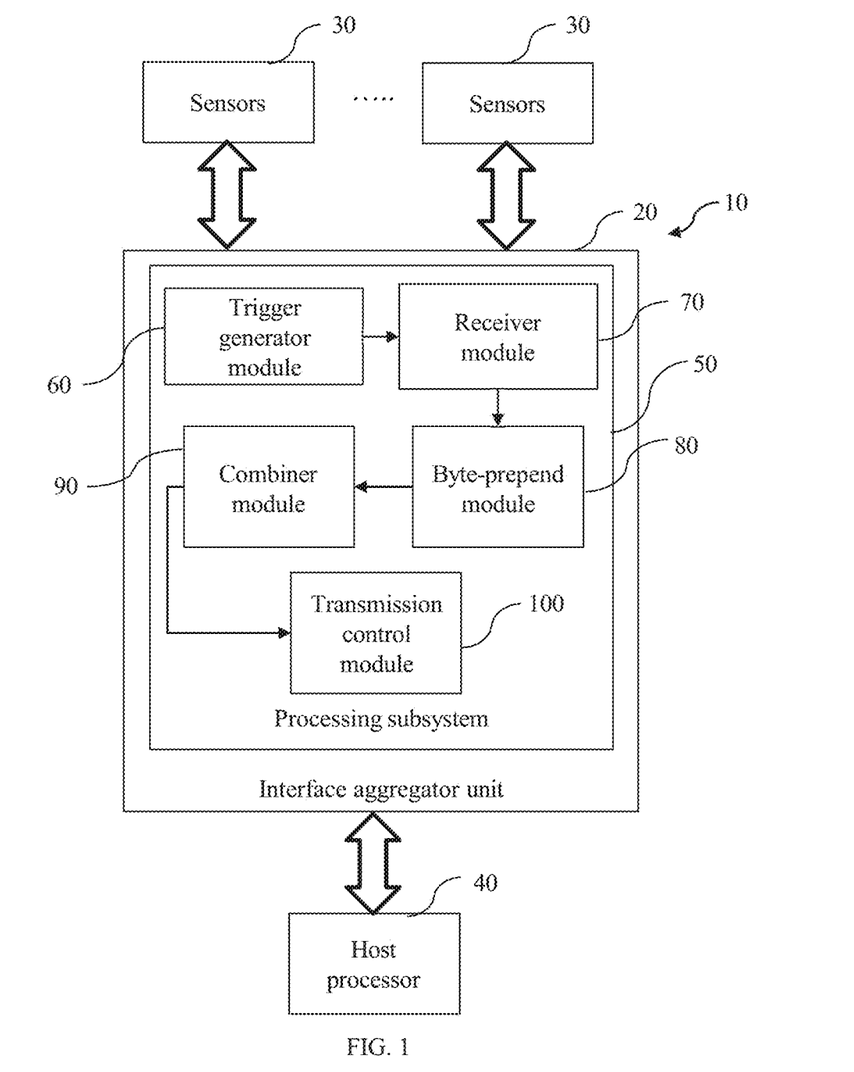
FIG. 1 is a block diagram representation of a system for assisting data transmission over one or more virtual channels in accordance with an embodiment of the present disclosure.

FIG. 1 is a block diagram representation of a system 10 for assisting data transmission over one or more virtual channels in accordance with an embodiment of the present disclosure. The system 10 includes an interface aggregator unit 20. In one embodiment, the interface aggregator unit 20 may correspond to a field-programmable gate array (FPGA). As used herein, the term "field-programmable gate array" refers to a semiconductor device that is based around a matrix of configurable logic blocks (CLBs) connected via programmable interconnects. FPGAs can be reprogrammed to desired application or functionality requirements after manufacturing. Further, the interface aggregator unit 20 is operatively coupled to at least two sensors 30 via corresponding at least two receiver interfaces. In one exemplary embodiment, the at least two sensors 30 may include at least one of one or more image sensors, one or more auxiliary sensors including a strobe sensor, an accelerometer, a gyrometer, a proximity sensor, a magnetometer, a barometer, a touch sensor, and the like.

Further, in an embodiment, when the at least two sensors 30 may be one or more image sensors, the at least two receiver interfaces may correspond to a mobile industry processor interface (MIPI®)-based receiver interface, a Universal serial bus (USB®)-based receiver interface, or the like. In one exemplary embodiment, the MIPI®-based receiver interface may include one or more versions of a MIPI-Camera Serial Interface (MIPI-CSI®) receiver interface, a MIPI-Display Serial Interface (MIPI-DSI®) receiver interface, or the like. Similarly, in one exemplary embodiment, the USB®-based receiver interface may include a USB-A® receiver interface, a USB-B® receiver interface, a USB-C® receiver interface, or the like.

Later, the interface aggregator unit 20 is also operatively coupled to a host processor 40 via a transmitter interface. In one embodiment, the transmitter interface may correspond to a MIPI®-based transmitter interface, a USB®-based transmitter interface, or the like. In one exemplary embodiment, the MIPI®-based transmitter interface may include one or more versions of a MIPI-CSI® transmitter interface, a MIPI-DSI® transmitter interface, or the like. Similarly, in one exemplary embodiment, the USB®-based transmitter interface may include a USB-A® transmitter interface, a USB-B® transmitter interface, a USB-C® transmitter interface, or the like.

Basically, the interface aggregator unit 20 may receive data from the corresponding at least two sensors 30, aggregate, and may transmit the same to the host processor 40 for further processing. Further, to enable the interface aggregator unit 20 to do the same, the interface aggregator unit 20 includes a processing subsystem 50. In one exemplary embodiment, the processing subsystem 50 may be hosted on a server, and may be operatively coupled to the interface aggregator unit 20. In one embodiment, the server may include a cloud server. In another embodiment, the server may include a local server. The processing subsystem 50 is configured to execute on a network (not shown in FIG. 1) to control bidirectional communications among a plurality of modules. In one embodiment, the network may include a wired network such as a local area network (LAN). In another embodiment, the network may include a wireless network such as wireless fidelity (Wi-Fi), Bluetooth, Zigbee, near field communication (NFC), infra-red communication (RFID), or the like.

In general, the interface aggregator unit 20 may receive the data sensed by the corresponding at least two sensors 30 randomly or soon after sensing the data. However, data synchronization may be needed for the proper processing of the data via the host processor 40. Therefore, the processing subsystem 50 includes a trigger generator module 60. The trigger generator module 60 is configured to generate a trigger signal based on a predefined trigger generation logic upon initiation of an operation of the interface aggregator unit 20 or a transmission request from a user. The trigger generator module 60 is also configured to transmit the trigger signal to the corresponding at least two sensors 30 for maintaining the data synchronization between a plurality of first data packets from a first set of sensors of the at least two sensors 30 and a plurality of second data packets from a second set of sensors of the at least two sensors 30. In one embodiment, the predefined trigger generation logic may correspond to enabling the at least two sensors 30 to sense the data and transmit the same to the interface aggregator unit 20 upon detection of the trigger signal generated periodically by the trigger generator module 60, for establishing the data synchronization between the data received from each of the at least two sensors 30. In such an embodiment, the trigger signal may be generated periodically for the at least two sensors to transmit the plurality of first data packets and the plurality of second data packets periodically. In such another embodiment, the trigger signal may be generated upon receiving the transmission request from the user, wherein the transmission request may correspond to a request for receiving the plurality of first data packets and the plurality of second data packets from the corresponding at least two sensors. As used herein, the term "data synchronization" is defined as the ongoing process of synchronizing data between two or more devices and updating changes automatically between them to maintain consistency within systems.

Basically, in an embodiment, the plurality of first data packets may include data packets transmitted by the first set of sensors of the at least two sensors 30, and the plurality of second data packets may include data packets transmitted by the second set of sensors of the at least two sensors 30. In one exemplary embodiment, the plurality of first data packets may have a plurality of first features, wherein the plurality of first features may include at least one of a first data resolution, a first data rate, a first data type, a first data format, and the like. Similarly, in one exemplary embodiment, the plurality of second data packets may have a plurality of second features, wherein the plurality of second features may include at least one of a second data resolution, a second data rate, a second data type, a second data format, and the like. Moreover, in one exemplary embodiment, the first set of sensors of the at least two sensors 30 may include one or more sensors of one or more first types. Similarly, in one exemplary embodiment, the second set of sensors of the at least two sensors 30 may include one or more sensors of one or more second types.

Further, the processing subsystem 50 also includes a receiver module 70 operatively coupled to the trigger generator module 60. The receiver module 70 is configured to receive the plurality of first data packets from the first set of sensors of the at least two sensors 30 using a predefined receiver interface protocol based on the transmission of the trigger signal. The receiver module 70 is also configured to receive the plurality of second data packets from the second set of sensors of the at least two sensors 30 using the predefined receiver interface protocol and simultaneously with the plurality of first data packets. As used herein, the term "interface protocol" is defined as a specification that defines how data is delivered and interpreted. In one embodiment, the predefined receiver interface protocol may be dependent on the corresponding at least two receiver interfaces. Therefore, in one embodiment, the predefined receiver interface protocol may include MIPI® receiver interface protocols, USB® receiver interface protocols, or the like.

Furthermore, in one exemplary embodiment, the MIPI-CSI® interface which may be for a receiver or a transmitter, may include MIPI-CSI-1®. MIPI-CSI-2®, MIPI-CSI-3®, and the like. Moreover, in an embodiment, the MIPI-CSI-2® may be the most used one. Therefore, the MIPI-CSI-2® may come with a protocol having one or more layers such as a physical layer, a lane merger layer, a low-level protocol layer, a pixel to byte conversion layer, an application layer, and the like. Commonly used in embedded vision systems, the MIPI-CSI-2® is a camera interface that connects an image sensor with an embedded board to control and process image data. This helps the image sensor and the embedded board to act together like a camera system to capture images. The MIPI-CSI-2® interface can offer a maximum bandwidth of about 6 Gigabytes per second (Gbps), with an attainable bandwidth of roughly about 5 Gbps. The MIPI-CSI-2® interface comes with the ability to use up to 32 virtual channels which accommodate image sensors with multiple data types. The MIPI-CSI-2® interface uses packets for communication that include data format and error correction code (ECC) functionality Subsequently, in order to differentiate the plurality of first data packets from the plurality of second data packets, the processing subsystem 50 also includes a byte-prepend module 80 operatively coupled to the receiver module 70. The byte-prepend module 80 is configured to generate first data by prepending at least one first byte to each of the plurality of first data packets upon receipt, based on a predefined byte prepend logic. The byte-prepend module 80 is also configured to generate second data by prepending at least one second byte to each of the plurality of second data packets upon receipt, based on the predefined byte prepend logic. In one embodiment, the predefined byte prepend logic may correspond to prepending one or more unique bytes to each of the plurality of first data packets and the plurality of second data packets for differentiating each of the plurality of first data packets and the plurality of second data packets with each other. For example, suppose '00' in decimal form ('0000 0000' in binary form) may be a first byte prepended to each of the plurality of first data packets, and '01' in decimal form ('0000 0001' in binary form) may be a second byte prepended to each of the plurality of second data packets. Therefore, upon receiving the plurality of first data packets and the plurality of second data packets, the host processor 40 may be able to differentiate between the plurality of first data packets and the plurality of second data packets upon observing the first byte and the second byte prepend to each of the plurality of first data packets and the plurality of second data packets.

Upon prepending one or more additional bytes to each of the plurality of first data packets and the plurality of second data packets, the first data and the second data thus obtained may have to be combined with each other to form a single data which can be transmitted through a single interface. Therefore, the processing subsystem 50 also includes a combiner module 90 operatively coupled to the byte-prepend module 80. The combiner module 90 is configured to generate merged data by combining the first data with the second data using a predefined combiner logic.

Figure 2:
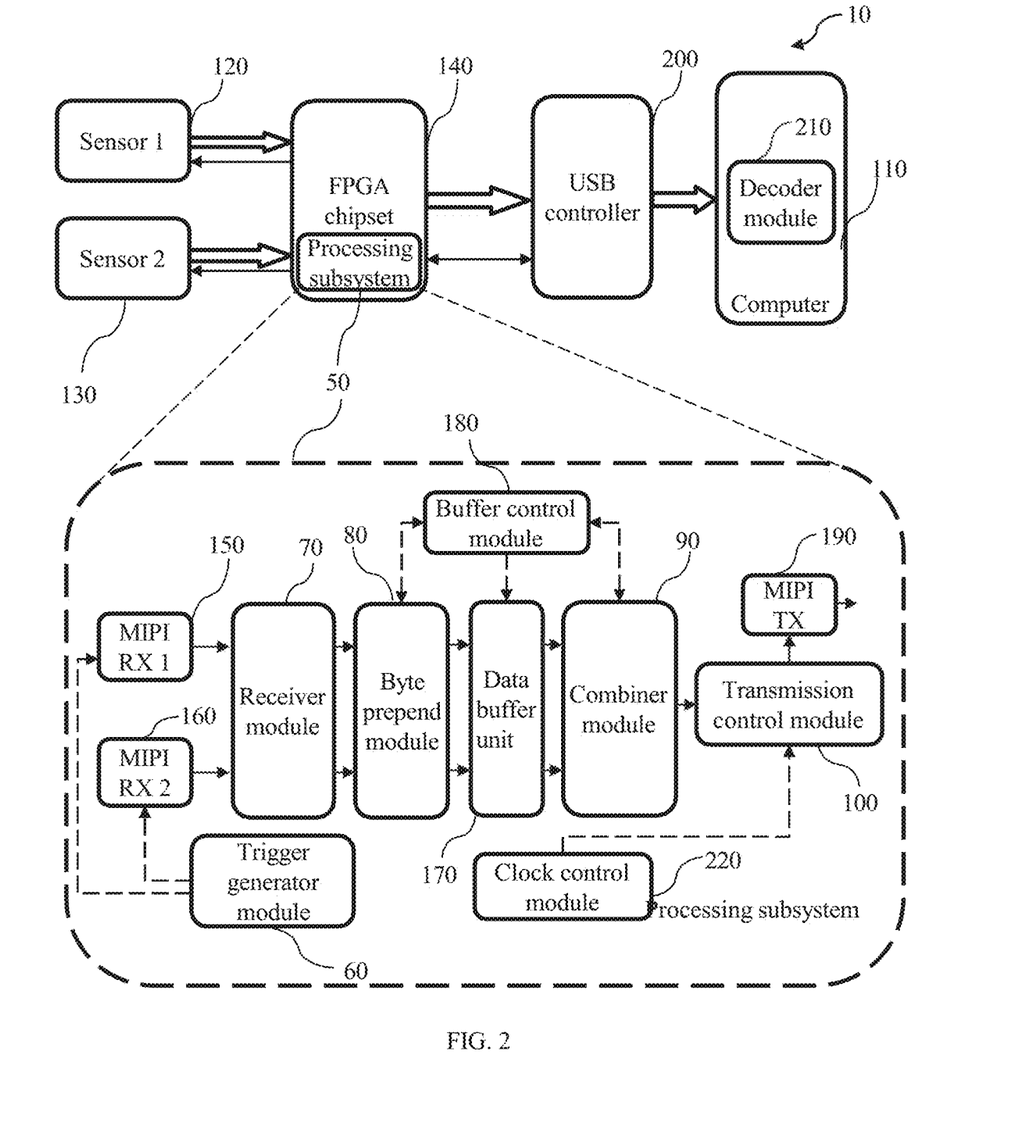
FIG. 2 is a block diagram representation of an exemplary embodiment of the system for assisting data transmission over one or more virtual channels of FIG. 1 in accordance with an embodiment of the present disclosure.

Prior to a combining operation, the first data and the second data may be stored temporarily. Thus, in one embodiment, the processing subsystem 50 may also include a buffer control module (as shown in FIG. 2) operatively coupled to the byte-prepend module 80. The buffer control module may be configured to control storage of the first data and the second data in a data buffer unit temporarily based on a predefined storage logic, for using the corresponding first data and the second data for generating merged data. As used herein, the term "data buffer unit" refers to a region of a physical memory storage used to temporarily store data while it is being moved from one place to another. Typically, the data is stored in the data buffer unit as it is retrieved from an input device or just before it is sent to an output device. In one embodiment, the predefined storage logic corresponds to receiving the first data from the byte-prepend module 80 upon generating the first data and storing the same for a certain time period. Then, the second data may be received from the byte-prepend module 80 upon generating the second data and storing the same for a certain time period. Now since both the first data and the second data are received, the first data and the second data may be sent to the combiner module 90 to generate the merged data. Then, the merged data is also temporarily stored in the data buffer unit before transmitting the same to the host processor 40.

Further, in one embodiment, the predefined combiner logic may correspond to prepending a first start of packet to the first data and suffixing a first end of packet to the first data, followed by prepending a second start of packet to the second data and suffixing a second end of packet to the second data, which is further followed by combining the first data with the second data. So, the first start of packet, the first end of packet, the second start of packet, and the second end of packet, may have to be identified to segregate the first data and the second data.

Upon combining, the merged data now can be transmitted to the host processor 40 via a single transmitter interface. Therefore, for the system 10 to be able to do that, the processing subsystem 50 also includes a transmission control module 100 operatively coupled to the combiner module 90. The transmission control module 100 is configured to control a transmission of the merged data to the host processor 40 along with a decoder logic using a predefined transmitter interface protocol, thereby assisting the data transmission over the one or more virtual channels. Later, upon receiving the merged data, the host processor 40 may have to be able to decode the merged data to differentiate between the first data and the second data. Therefore, in one embodiment, the host processor 40 may include a decoder module (as shown in FIG. 2). The decoder module may be configured to decode the merged data received from the interface aggregator unit 20, by splitting the merged data into the first data and the second data based on the decoder logic. In one embodiment, the decoder logic may correspond to information about the predefined byte prepend logic, and the predefined combiner logic used for prepending and combining for generating the merged data by the interface aggregator unit 20. Additionally, in one embodiment, the predefined transmitter interface protocol may include MIPI® transmitter interface protocols, USB® transmitter interface protocols, or the like.

Moreover, in one exemplary embodiment, the interface aggregator unit 20 may be operatively coupled to the host processor 40 via a USB controller unit. The USB controller unit may be operatively coupled to the interface aggregator unit 20 via the transmitter interface. As used herein, the term "USB controller" refers to a chip or device that allows the computer to communicate with the USB device. This is often referred to as the host controller interface (HCL), the host being the computer. Therefore, in one embodiment, the host processor 40 may be a computer, a laptop, or the like.

Basically, in an embodiment, the trigger generator module 60 may be generating the trigger signal periodically, and the receiver module 70 may be receiving the plurality of first data packets and the plurality of second data packets periodically. In either case, periodically refers to at regularly occurring intervals. In such an embodiment, the regularly occurring intervals may be achieved because of the operation of the system 10 at an input clock speed, wherein the input clock speed may be a constant value or a variable value. Further, in an embodiment, based on the regularly occurring intervals associated with the receiver module 70, the transmission control module 100 may also transmit at regularly occurring intervals. The regularly occurring intervals associated with the transmission control module 100 may be referred to as an output clock speed. Further, in one embodiment, the processing subsystem 50 may also include a clock control module (as shown in FIG. 2) operatively coupled to the transmission control module 100. The clock control module may be configured to control the output clock speed corresponding to an operation of the transmission control module 100 dynamically based on the input clock speed corresponding to an operation of the receiver module 70 using a clock control logic. In one exemplary embodiment, the clock control logic may correspond to defining a relationship between the input clock speed and the output clock speed. Therefore, in an embodiment, the output clock speed may be maintained the same as the input clock speed. Any changes in the input clock speed may be reflected in the output clock speed.

FIG. 2 is a block diagram representation of an exemplary embodiment of the system 10 for assisting data transmission over one or more virtual channels of FIG. 1 in accordance with an embodiment of the present disclosure. Suppose a computer 110 is receiving visual data from a 'sensor 1' 120 and a 'sensor 2' 130, wherein the computer 110 is substantially similar to the host processor 40 of FIG. 1. Suppose the visual data received from the 'sensor 1' 120 include a sensor-1-frame-1 data having a data format of UYVY format and a data resolution of 640×480 Pixels per inch (PPI), and a sensor-1-frame-2 data having the UYVY format and the data resolution of 1920×1080 PPI. Similarly, the visual data received from the 'sensor 2' 130 include a sensor-2-frame-1 data and a sensor-2-frame-2 data in RAW 12 format and the data resolution of 640×480 PPI. Also, the visual data received from the 'sensor 2' 130 is a variety of compositions (VC) merged. Here the 'sensor 1' 120 and the 'sensor 2' 130 are camera sensors and hence are not directly interfaced to the computer 110. An FPGA chipset 140 is used for receiving the visual data sensed by the 'sensor 1' 120 and the 'sensor 2' 130, pre-processed, and then pre-processed data is shared with the computer 110, wherein the FPGA chipset 140 is substantially similar to the interface aggregator unit 20 of FIG. 1. The FPGA chipset 140 includes the processing subsystem 50 which performs a pre-processing operation of the visual data sensed by the 'sensor 1' 120 and the 'sensor 2' 130. Here, the pre-processed data would be merged first data including the sensor-1-frame-1 data merged with the sensor-2-frame-1 data and merged second data including the sensor-1-frame-2 data merged with the sensor-2-frame-2 data. So basically, the 'sensor 1' 120 is interfaced with the FPGA chipset 140 via a MIPI®-RX 1 interface 150, and the 'sensor 2' 130 is interfaced with the FPGA chipset 140 via a MIPI®-RX 2 interface 160. So, basically, the visual data is received by the FPGA chipset 140 from two different interfaces. Then, the visual data is transmitted to the receiver module 70 based on the trigger signal generated by the trigger generator module 60.

Later, suppose the sensor-1-frame-1 data is prepended with a byte say 0000 0000 (binary format), the sensor-1-frame-2 data with 0000 0001 (binary format), the sensor-2-frame-1 data with 0001 0000 (binary format), and the sensor-2-frame-2 data with 0001 0001 (binary format) via the byte-prepend module 80 and saved in the data buffer unit 170 via the buffer control module 180. Basically, each line in a frame of the visual data is prepended with a byte. Then, the merged first data and the merged second data are generated via the combiner module 90 upon prepending. Then, a single transmitter interface such as a MIPI®-TX interface 190 is enough to transmit the merged first data and the merged second data, wherein the transmission is controlled via the transmission control module 100. Further, the FPGA chipset 140 is coupled to the computer 110 via a USB controller 200. Moreover, only a single MIPI® interface is supported by the USB controller 200. Further, the USB controller 200 cannot decode a MIPI® header and does not support VC merged MIPI® data input. Therefore, the USB controller 200 is coupled with the FPGA chipset 140 to overcome these drawbacks. Upon transmission, the computer 110 should be able to decode the merged first data and the merged second data, wherein the computer 110 is able to do so via the decoder module 210 present inside of the computer 110. Further, the output clock speed corresponding to the operation of the transmission control module 100 can be controlled dynamically based on the input clock speed corresponding to the operation of the receiver module 70 via the clock control module 220, thereby assisting in the data transmission from the 'sensor 1' 120 and the 'sensor 2' 130 to the computer 110 over the one or more virtual channels, for further processing of the corresponding data.

Figure 3:
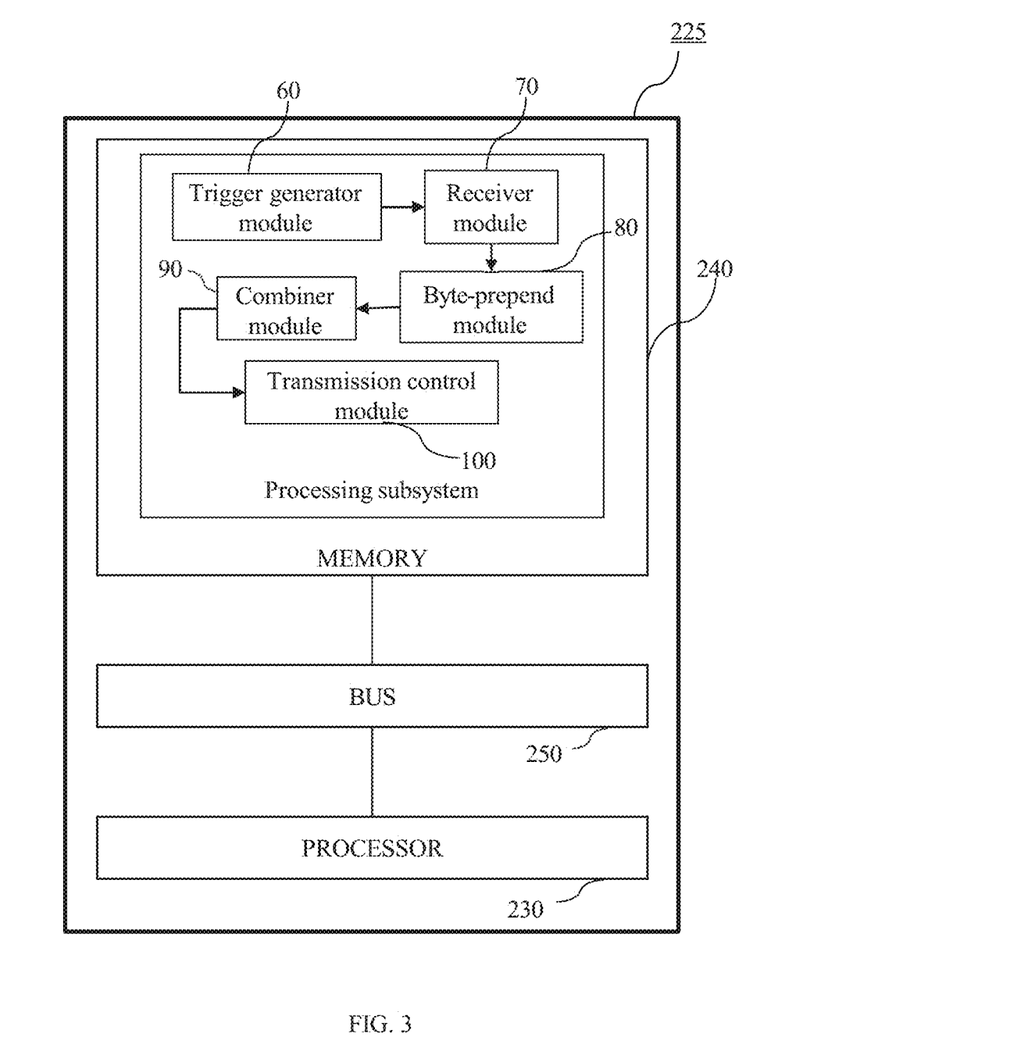
FIG. 3 is a block diagram of a data transmission device, a data transmission system, a data transmission computer, or a data transmission server in accordance with an embodiment of the present disclosure.

FIG. 3 is a block diagram of a data transmission device, a data transmission system, a data transmission computer, or a data transmission server 225 in accordance with an embodiment of the present disclosure. One such embodiment, may include an embedded camera application system. The data transmission server 225 includes processor(s) 230, and memory 240 operatively coupled to a bus 250. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 230.

Figure 4:
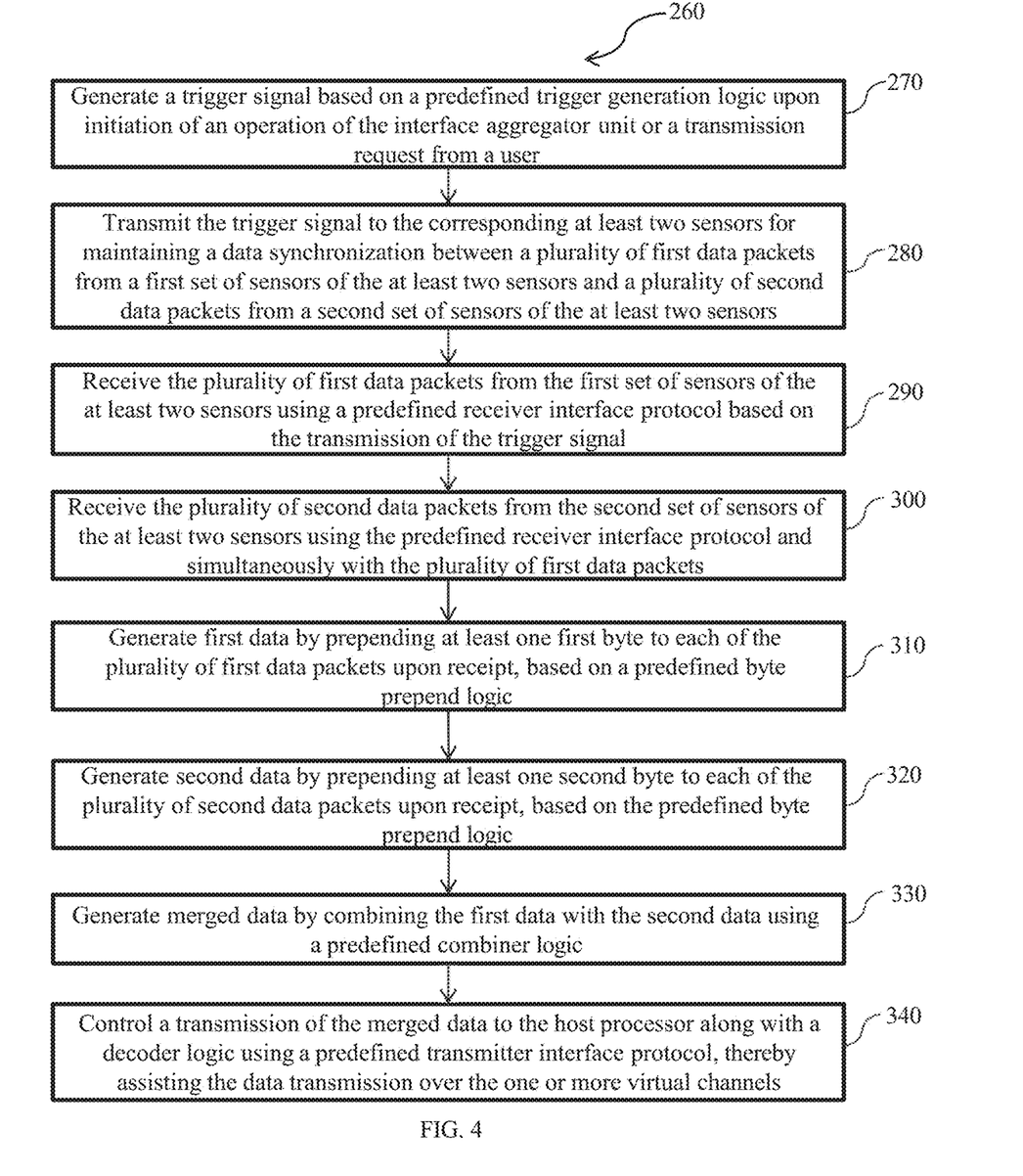
FIG. 4 is a flow chart representing steps involved in a method for assisting data transmission over one or more virtual channels in accordance with an embodiment of the present disclosure.

The memory 240 includes a plurality of subsystems stored in the form of executable program which instructs the processor(s) 230 to perform method steps illustrated in FIG. 4. The memory 240 includes a processing subsystem 50 of FIG. 1. The processing subsystem 50 further has following modules: a trigger generator module 60, a receiver module 70, a byte-prepend module 80, a combiner module 90, and a transmission control module 100.

The trigger generator module 60 is configured to generate a trigger signal based on a predefined trigger generation logic upon initiation of an operation of the interface aggregator unit 20 or a transmission request from a user. The trigger generator module 60 is also configured to transmit the trigger signal to the corresponding at least two sensors 30 for maintaining a data synchronization between a plurality of first data packets from a first set of sensors of the at least two sensors 30 and a plurality of second data packets from a second set of sensors of the at least two sensors 30.

The receiver module 70 is configured to receive the plurality of first data packets from the first set of sensors of the at least two sensors 30 using a predefined receiver interface protocol based on the transmission of the trigger signal. The receiver module 70 is also configured to receive the plurality of second data packets from the second set of sensors of the at least two sensors 30 using the predefined receiver interface protocol and simultaneously with the plurality of first data packets.

The byte-prepend module 80 is configured to generate first data by prepending at least one first byte to each of the plurality of first data packets upon receipt, based on a predefined byte prepend logic. The byte-prepend module 80 is also configured to generate second data by prepending at least one second byte to each of the plurality of second data packets upon receipt, based on the predefined byte prepend logic.

The combiner module 90 is configured to generate merged data by combining the first data with the second data using a predefined combiner logic. The transmission control module 100 is configured to control a transmission of the merged data to the host processor 40 along with a decoder logic using a predefined transmitter interface protocol, thereby assisting the data transmission over one or more virtual channels.

The bus 250 as used herein refers to be internal memory channels or computer network that is used to connect computer components and transfer data between them. The bus 250 includes a serial bus or a parallel bus, wherein the serial bus transmits data in a bit-serial format and the parallel bus transmits data across multiple wires. The bus 250 as used herein, may include but not limited to, a system bus, an internal bus, an external bus, an expansion bus, a frontside bus, a backside bus, and the like.

FIG. 4 is a flow chart representing steps involved in a method 260 for assisting data transmission over one or more virtual channels in accordance with an embodiment of the present disclosure. The method 260 includes generating a trigger signal based on a predefined trigger generation logic upon initiation of an operation of the interface aggregator unit or a transmission request from a user in step 270. In one embodiment, generating the trigger signal may include generating the trigger signal via a trigger generator module 60.

The method 260 also includes transmitting the trigger signal to the corresponding at least two sensors for maintaining a data synchronization between a plurality of first data packets from a first set of sensors of the at least two sensors and a plurality of second data packets from a second set of sensors of the at least two sensors in step 280. In one embodiment, transmitting the trigger signal may include transmitting the trigger signal via the trigger generator module 60.

Furthermore, the method 260 includes receiving the plurality of first data packets from the first set of sensors of the at least two sensors using a predefined receiver interface protocol based on the transmission of the trigger signal in step 290. In one embodiment, receiving the plurality of first data packets may include receiving the plurality of first data packets via a receiver module 70.

Furthermore, the method 260 also includes receiving the plurality of second data packets from the second set of sensors of the at least two sensors using the predefined receiver interface protocol and simultaneously with the plurality of first data packets in step 300. In one embodiment, receiving the plurality of second data packets may include receiving the plurality of second data packets via the receiver module 70.

Furthermore, the method 260 also includes generating first data by prepending at least one first byte to each of the plurality of first data packets upon receipt, based on a predefined byte prepend logic in step 310. In one embodiment, generating the first data may include generating the first data via a byte-prepend module 80.

Furthermore, the method 260 also includes generating second data by prepending at least one second byte to each of the plurality of second data packets upon receipt, based on the predefined byte prepend logic in step 320. In one embodiment, generating the second data may include generating the second data via the byte-prepend module 80.

Furthermore, the method 260 also includes generating merged data by combining the first data with the second data using a predefined combiner logic in step 330. In one embodiment, generating the merged data may include generating the merged data via a combiner module 90.

Furthermore, the method 260 also includes controlling a transmission of the merged data to the host processor along with a decoder logic using a predefined transmitter interface protocol, thereby assisting the data transmission over the one or more virtual channels in step 340. In one embodiment, controlling the transmission of the merged data may include controlling the transmission of the merged data via a transmission control module 100. In one exemplary embodiment, the method 260 may further include controlling storage of the first data and the second data in a data buffer unit temporarily based on a predefined storage logic, for using the corresponding first data and the second data for generating the merged data. In such embodiment controlling the storage of the first data and the second data in the data buffer unit may include controlling the storage of the first data and the second data in the data buffer unit via a buffer control module 180.

Further, in one exemplary embodiment, the method 260 may also include controlling an output clock speed corresponding to an operation of the transmission control module dynamically based on an input clock speed corresponding to an operation of the receiver module using a clock control logic. In such an embodiment, controlling the output clock speed may include controlling the output clock speed via a clock control module 220.

Various embodiments of the present disclosure enable the host processor to receive data from different types of sensors via a single interface without the need for any additional processing. The system also enables the host processor to be able to receive and process the data with different data formats, different data rates, different data resolutions, and a variety of compositions (VC) merged data. Further, the system enables controlling the output clock speed dynamically based on the input clock speed, thus eliminating a bandwidth restriction to a particular MIPI® speed.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for assisting data transmission over one or more virtual channels comprising:
   an interface aggregator unit operatively coupled to at least two sensors via corresponding at least two receiver interfaces, and a host processor via a transmitter interface;
   a processor coupled to the interface aggregator unit;
   a memory coupled to the processor, wherein the memory comprises a set of program instructions in the form of a plurality of subsystems, configured to be executed by the processor, wherein the plurality of subsystems comprises a processing subsystem configured to execute on a network to control bidirectional communications among a plurality of modules comprising:
      a trigger generator module configured to:
         generate a trigger signal based on a predefined trigger generation logic upon initiation of an operation of the interface aggregator unit or a transmission request from a user; and
         transmit the trigger signal to the corresponding at least two sensors for maintaining a data synchronization between a plurality of first data packets from a first set of sensors of the at least two sensors and a plurality of second data packets from a second set of sensors of the at least two sensors;

a receiver module operatively coupled to the trigger module, wherein the receiver module is configured to:
receive the plurality of first data packets from the first set of sensors of the at least two sensors using a predefined receiver interface protocol based on the transmission of the trigger signal; and
receive the plurality of second data packets from the second set of sensors of the at least two sensors using the predefined receiver interface protocol and simultaneously with the plurality of first data packets;

a byte-prepend module operatively coupled to the receiver module, wherein the byte-prepend module is configured to:
generate first data by prepending at least one first byte to each of the plurality of first data packets upon receipt, based on a predefined byte prepend logic; and
generate second data by prepending at least one second byte to each of the plurality of second data packets upon receipt, based on the predefined byte prepend logic;

a combiner module operatively coupled to the byte-prepend module, wherein the combiner module is configured to generate merged data by combining the first data with the second data using a predefined combiner logic; and a transmission control module operatively coupled to the combiner module, wherein the transmission control module is configured to control a transmission of the merged data to the host processor along with a decoder logic using a predefined transmitter interface protocol, thereby assisting the data transmission over the one or more virtual channels.

2. The system of claim 1, wherein the at least two sensors comprises at least one of one or more image sensors, one or more auxiliary sensors comprising a strobe sensor, an accelerometer, and a gyrometer.

3. The system of claim 1, wherein the plurality of first data packets comprises a plurality of first features comprising at least one of a first data resolution, a first data rate, a first data type, and a first data format, wherein the plurality of second data packets comprises a plurality of second features comprising at least one of a second data resolution, a second data rate, a second data type, and a second data format.

4. The system of claim 1, wherein the interface aggregator unit is operatively coupled to the host processor via a universal serial bus controller unit, wherein the universal serial bus controller unit is operatively coupled to the interface aggregator unit via the transmitter interface.

5. The system of claim 1, wherein the processing subsystem comprises a buffer control module operatively coupled to the byte-prepend module, wherein the buffer control module is configured to control storage of the first data and the second data in a data buffer unit temporarily based on a predefined storage logic, for using the corresponding first data and the second data for generating the merged data.

6. The system of claim 1, wherein the processing subsystem comprises a clock control module operatively coupled to the transmission control module, wherein the clock control module is configured to control an output clock speed corresponding to an operation of the transmission control module dynamically based on an input clock speed corresponding to an operation of the receiver module using a clock control logic.

7. The system of claim 1, wherein the host processor comprises a decoder module configured to decode the merged data received from the interface aggregator unit, by splitting the merged data into the first data and the second data based on the decoder logic.

8. A method for assisting data transmission over one or more virtual channels comprising:
generating, via a trigger generator module, a trigger signal based on a predefined trigger generation logic upon initiation of an operation of an interface aggregator unit or a transmission request from a user;
transmitting, via the trigger generator module, the trigger signal to the at least two sensors for maintaining a data synchronization between a plurality of first data packets from a first set of sensors of the at least two sensors and a plurality of second data packets from a second set of sensors of the at least two sensors;
receiving, via a receiver module, the plurality of first data packets from the first set of sensors of the at least two sensors using a predefined receiver interface protocol based on the transmission of the trigger signal;
receiving, via the receiver module, the plurality of second data packets from the second set of sensors of the at least two sensors using the predefined receiver interface protocol and simultaneously with the plurality of first data packets;
generating, via a byte-prepend module, first data by prepending at least one first byte to each of the plurality of first data packets upon receipt, based on a predefined byte prepend logic;
generating, via the byte-prepend module, second data by prepending at least one second byte to each of the plurality of second data packets upon receipt, based on the predefined byte prepend logic;
generating, via a combiner module, merged data by combining the first data with the second data using a predefined combiner logic; and
controlling, via a transmission control module, a transmission of the merged data to a host processor along with a decoder logic using a predefined transmitter interface protocol, thereby assisting the data transmission over the one or more virtual channels.

9. The method of claim 8, comprising controlling, via a buffer control module, storage of the first data and the second data in a data buffer unit temporarily based on a predefined storage logic, for using the first data and the second data for generating the merged data.

10. The method of claim 8, comprising controlling, via a clock control module, an output clock speed corresponding to an operation of the transmission control module dynamically based on an input clock speed corresponding to an operation of the receiver module using a clock control logic.

* * * * *